United States Patent
Blanding

Patent Number: 5,333,513
Date of Patent: Aug. 2, 1994

[54] AVERAGING HALF-NUTS

[75] Inventor: Douglass L. Blanding, Rochester, N.Y.

[73] Assignee: Eastman Kodak Company, Rochester, N.Y.

[21] Appl. No.: 336

[22] Filed: Jan. 4, 1993

[51] Int. Cl.$^5$ .................. F16H 1/18; F16H 55/17
[52] U.S. Cl. .................. 74/424.8 A; 74/441; 74/459
[58] Field of Search ........ 74/89.15, 424.8 R, 424.8 A, 74/441, 459

[56] References Cited

U.S. PATENT DOCUMENTS

| | | | |
|---|---|---|---|
| 2,252,796 | 8/1941 | Whittell | 74/441 |
| 2,857,778 | 10/1958 | Rokos | 74/441 |
| 4,210,033 | 7/1980 | Erikson et al. | 74/424.8 A |

OTHER PUBLICATIONS

Berwald, D., "Self-Adjusting Not for Use on Lead Screw", IBM Technical Disclosure Bulletin, vol. 25, No. 9, Feb. 1983.
Siegl, L. R., "Access Drive Mechanism", IBM Technical Disclosure Bulletin, vol. 13, No. 12, May 1971.

Primary Examiner—Leslie A. Braun
Assistant Examiner—David W. Laub
Attorney, Agent, or Firm—Dennis R. Arndt

[57] ABSTRACT

A relatively inexpensive means for preventing the transmission of thread drunkenness to a carriage or other element being driven by a lead screw comprising a drive nut formed of a pair of half-nuts arranged to engage the thread of the lead screw. An intermediate member is connected to the half-nuts and to a carriage connector member to permit movement of the intermediate member relative to the connector member only by rotation about a pivot axis perpendicular to the axis of the lead screw and lying in a plane which extends between the half-nuts. The half-nuts are connected to the intermediate member to locate the intermediate member with respect to the half-nuts along the axis of the lead screw and to prevent rotation of the half-nuts about the lead screw axis, whereby uneven advance of the two half-nuts along the axis of the lead screw causes the intermediate member to rotate about the pivot axis to provide uniform motion along the lead screw axis to the connector member.

7 Claims, 4 Drawing Sheets

AVERAGING HALF-NUTS

FIELD OF THE INVENTION

The present invention is directed to precision devices using a lead screw to move one element relative to another without transferring periodic variations in the threads of the lead screw to the other element and, more particularly, to apparatus for the generation of prints from electronic data wherein the transfer of such thread variations would degrade the resulting image.

BACKGROUND OF THE INVENTION

It is known that periodic velocity variations superimposed upon the nominally constant velocity of a print head in a scan printing apparatus produce an image defect known as "banding". Inasmuch as lead screws are commonly used to move the print head during scan printing, the typical characteristic of lead screws to have subtle, once per revolution, errors manufactured into their threads, sometimes known as "thread drunkenness" unfortunately results in image banding.

Efforts at eliminating the effect of thread drunkenness on images produced by such scanning systems has resulted in requiring ever higher precision lead screws at higher and higher costs. Unfortunately, this has increased the cost of such printers while not entirely eliminating the problem.

SUMMARY OF INVENTION

Thus, the present invention provides a relatively inexpensive means of preventing the transmission of thread drunkenness to a carriage or other element being driven by a lead screw.

According to one aspect of the present invention, a drive nut is provided for transferring motion from a lead screw to a carriage comprising a pair of half-nuts arranged to engage the thread of the lead screw. An intermediate member is connected to the half-nuts and the carriage is connected to the intermediate member to permit movement of the intermediate member relative to the carriage by rotation about a pivot axis perpendicular to the axis of the lead screw and lying in a plane which extends between the half- nuts. Means is provided for connecting each of the half-nuts to the intermediate member to locate the intermediate member with respect to the half-nuts along the axis of the lead screw and to prevent rotation of the half-nuts about the lead screw axis, whereby uneven advance of the two half-nuts along the axis of the lead screw causes the intermediate member to rotate about the pivot axis to provide uniform motion along the lead screw axis to the connector member.

According to another aspect of the present invention, a drive nut is provided for transferring motion from a lead screw to a carriage with the drive nut comprising a pair of diametrically spaced half-nuts having an internal thread matching the thread of the lead screw. Garter spring means are provided to embrace the ends of the half-nuts for applying a nesting force to hold the half-nuts in opposed engagement with the lead screw without applying constraint to the axial position of the half-nuts along the lead screw. The half-nuts engage diametrically opposite sides of the lead screw with a diametrically opposed gap between the two half-nuts. An intermediate member is connected to the half-nuts, and a connector member, adapted for connection to a carriage, is pivotally connected to the intermediate member. The pivotal connection of the intermediate member to the connector member permits only rotation of the intermediate member relative to the connector member about an axis perpendicular to the axis of the lead screw and lying in a plane which intersects the gap between the half-nuts. Means is provided for connecting one of the half-nuts to the intermediate member at a location remote from the pivot means and remote from the axis of the lead screw to positively locate the intermediate member with respect to that one half-nut along the direction of the axis of the lead screw and to prevent rotation of the half-nut about the axis of the lead screw. Means is also provided for connecting the other of the half-nuts to the intermediate member at a location remote from the pivot means and diametrically opposite from the connection to the first of the half-nuts and equispaced from the axis of the lead screw to positively locate the intermediate member with respect to the other half-nut along the direction of the axis of the lead screw and to prevent rotation of the other half-nut about the axis of the lead screw. The means for connecting the intermediate member to each of the half-nuts being disposed on opposite sides of the axis of rotation of the intermediate member whereby uneven advance of the two half-nuts along the axis of the lead screw caused by a once-per-revolution cyclical error in the lead screw causes the intermediate member to rotate about its pivot means to compensate for the uneven advance thereby providing the connector member with uniform motion along the lead screw.

Various means for practicing the invention and other features and advantages thereof will be apparent from the following detailed description of an illustrative, preferred embodiment, reference being made to the accompanying drawings.

DESCRIPTION OF THE PREFERRED EMBODIMENT

Figure 1:
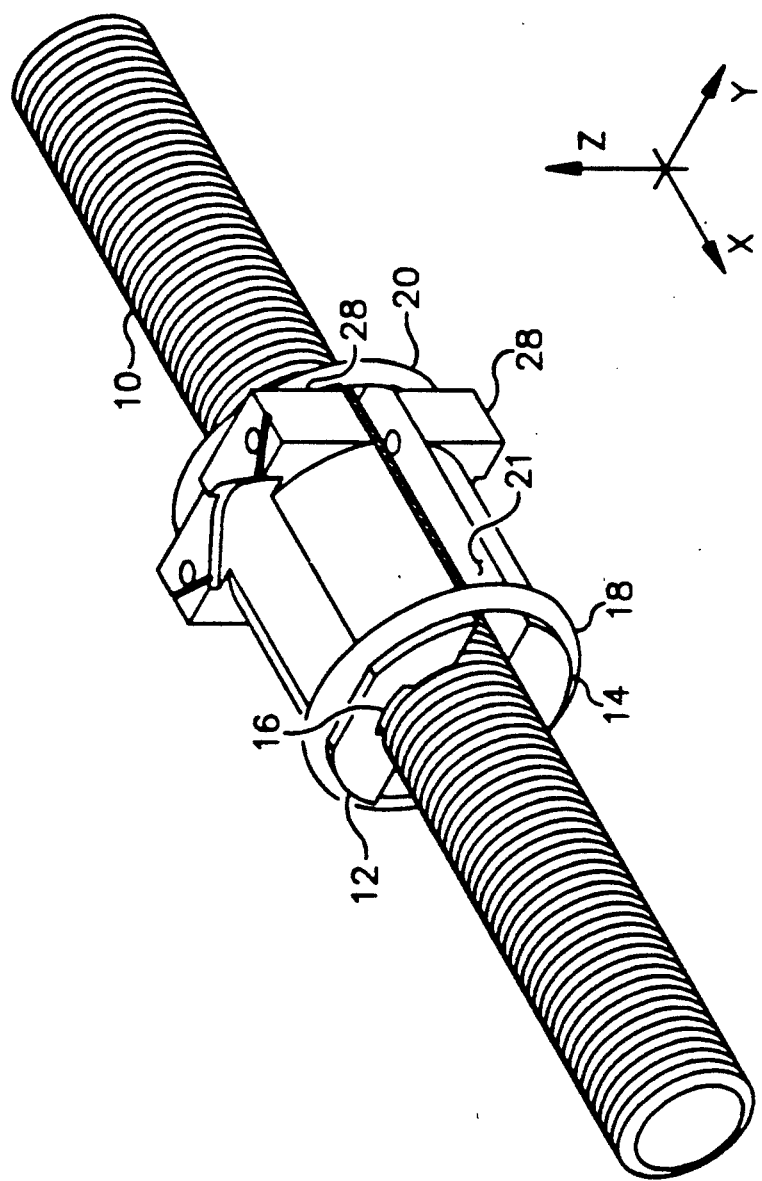
FIG. 1 is an illustration of a portion of the present invention showing two half-nuts mated with a lead screw.
Figure 3:
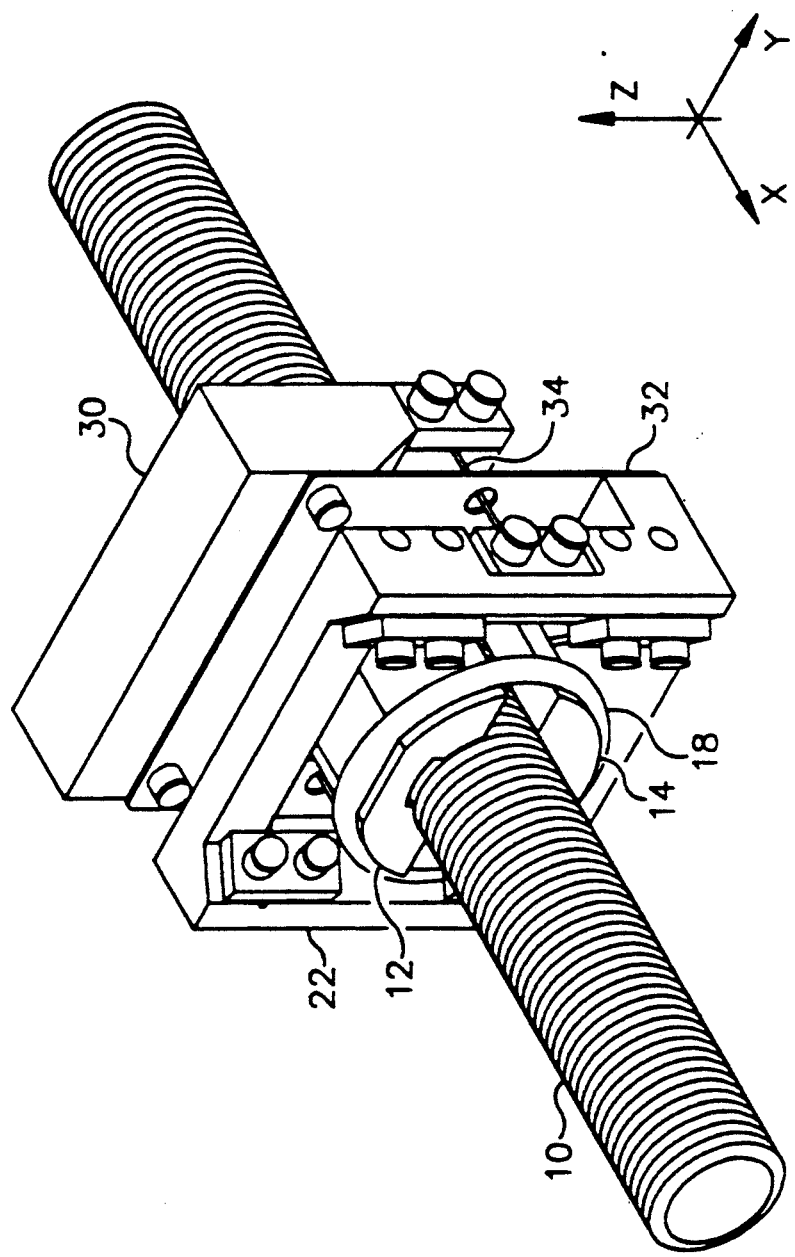
FIG. 3 is an illustration of the completed assembly.

Referring now to FIG. 1, a drive nut assembly is illustrated for use with a lead screw 10 and comprises two half-nuts, 12 and 14, mounted on the lead screw. Each of the half-nuts is provided with a threaded portion, not shown, which is arranged to mate with and have the same thread structure as the lead screw. Each of the threaded portions of the half-nut is relieved by a groove 16 along the center, whereby the remaining threaded portions of the half-nut engage the lead screw as a "v" block. A pair of garter springs 18 and 20 are disposed in grooves, not shown, at each end of the half nuts and provide the force to nest the half-nuts in opposed, diametrically spaced engagement with the lead screw threads. The dimensions of the half-nuts are such that a diametrically opposed gap 21 is formed between the two half-nuts. Each half-nut is thereby constrained to the lead screw in X,Y,Z, $\theta y$ and $\theta z$ directions, as related by the system coordinates illustrated in FIG. 3.

Thus, each half-nut has only one degree of freedom with respect to the screw: namely θx.

Figure 2:
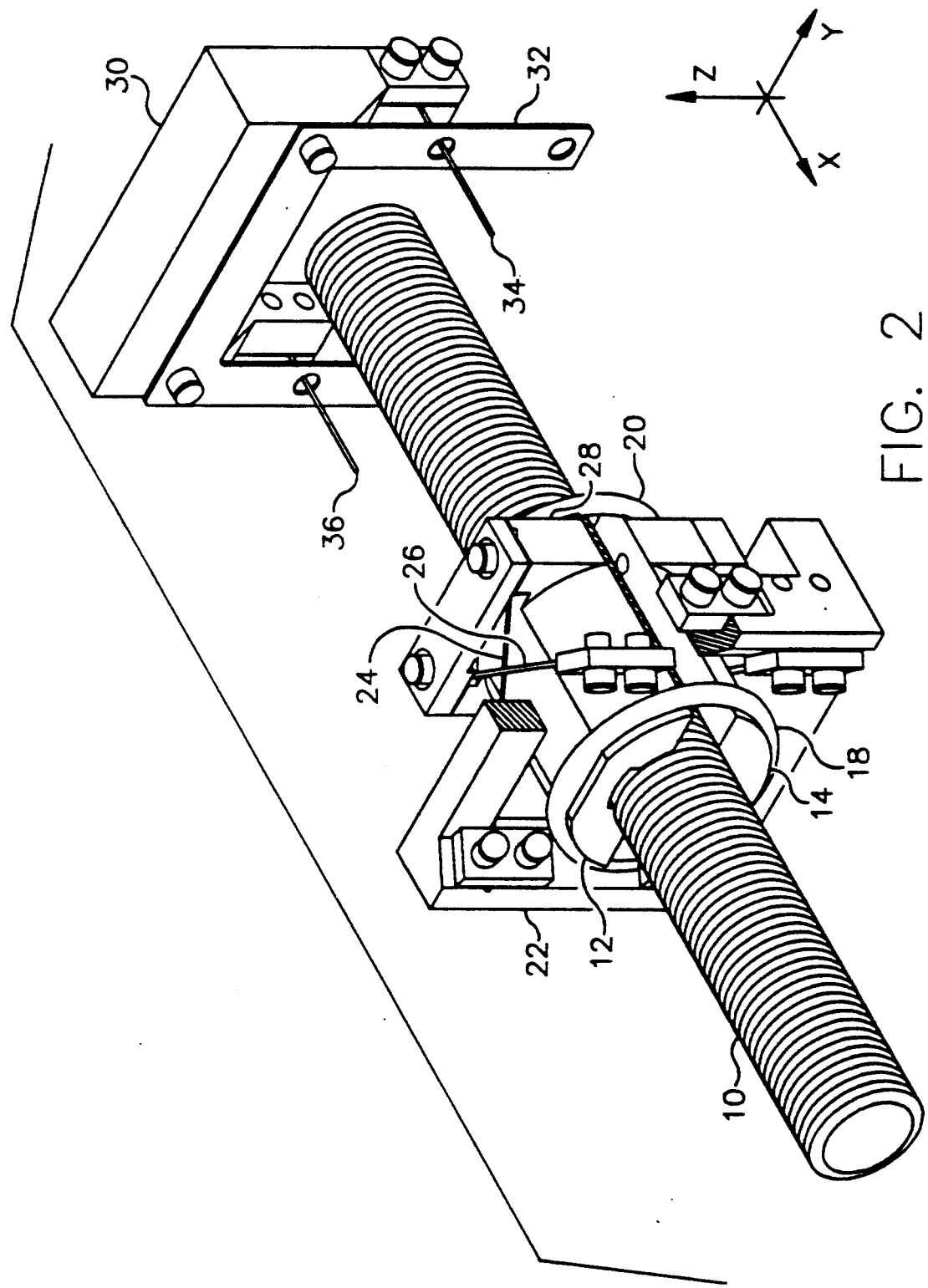
FIG. 2 is an illustration of the drive nut assembly, partially in section, with a portion displaced to show the remainder of the assembly.

FIG. 2, partially exploded, illustrates the connection of the half-nuts 12 and 14 to an intermediate member 22, which functions as a whiffletree ring, in a manner to be described hereinbelow. Each half-nut is connected by a pair of wire flexures, 24 and 26, to the whiffletree ring 22, which has a portion cut away in FIG. 2 to show the wire flexures connected to the upper half-nut 12. The wire flexures are positioned between a mounting block 28 on the half-nut 12 and the whiffletree ring so that a line parallel to the Z-axis of the system intersects all four wire flexures (of the upper and the lower half nuts) and also goes through the centers of the half-nuts. The effect of these wire flexures is to provide constraint of the half-nuts, 12 and 14, in the θx dimension by the whiffletree ring 22, and to provide an axially rigid connection (in the x-direction) between each half-nut and the whiffletree ring, or intermediate member to positively locate the intermediate member along the lead screw axis with respect to that half-nut.

A connector member 30 is adapted for connection between a carriage, not shown, which is to be driven by the lead screw and the whiffletree ring 22. The connector member is rigidly connected to the carriage which is constrained so as to be free only in the X axis (along the length of the lead screw) by support means known in the art. The connector member and the whiffletree ring are connected by a set of flexures consisting of a U-shaped sheet flexure 32 and two wire flexures, 34 and 36, substantially as shown. This arrangement of flexures allows the whiffletree ring to pivot about an axis defined by the points where the wire flexures, 34 and 36, cross the plane of the sheet flexure 32. This axis is parallel to the Y-axis and extends through the diametrically opposed gap 21 formed between the two half-nuts and intersects the axis of the lead screw.

The operation of the drive nut assembly is as follows: As the screw rotates about its axis, the half-nuts, threadedly engaging the threads of the lead screw, are driven axially. Superimposed on this nominally uniform axial motion, the two half-nuts move forward and backward (with respect to each other) a small amount as a result of screw thread "drunkenness". This "drunkenness" produces a roughly sinusoidal variation in the axial motion of the half-nuts at a frequency of once per revolution of the lead screw. The motion of one half-nut is 180° out of phase with the motion of the other half-nut. Since the axial connections between each of the half-nuts and the whiffletree ring are substantially rigid, and because the whiffletree is free to rotate about the axis parallel to the Y-axis which extends through the diametrically opposed gap 21 formed between the two half-nuts, the whiffletree ring will rock about that axis as the two half-nuts respond to the sinusoidal variation the lead screw threads. Inasmuch as the whiffletree ring is connected to the connector member through that same axis, the rocking motion imparted to the whiffletree ring by the half-nuts will not be transferred to the connector member and only the average axial positions of the two half-nuts is connected to the connector member.

ALTERNATIVE EMBODIMENTS

Figure 4:
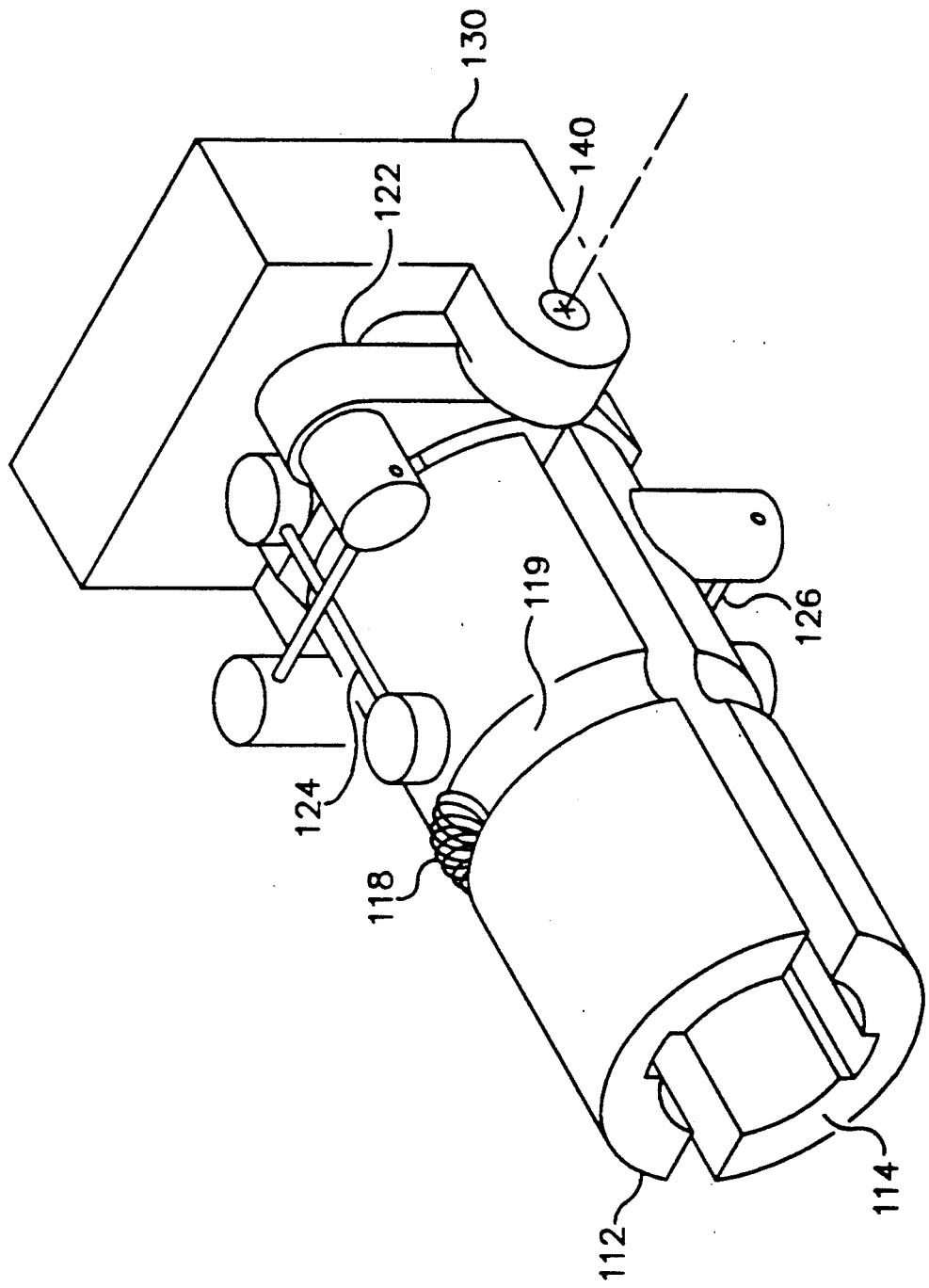
FIG. 4 is an illustration of an alternative embodiment.

An alternative embodiment is illustrated in FIG. 4, wherein similar components are identified with similar reference numbers with the prefix "1". This embodiment employs only a single garter spring 118 (shown partially cut away) mounted in a centrally located circumferential groove 119 to hold the two half-nuts 112 and 114 (having internal threads, not shown) in engagement with the lead screw, not shown. The flexure connections, 124 and 126, between the half-nuts and the whiffletree ring 122 are a variation of those illustrated in the preferred embodiment. However, the flexure connections between the whiffletree ring 122 and the connector member 130 are replaced with a pair of hinge pins 140 (only one of which is shown) which are axially aligned on opposite sides of the lead screw to connect the whiffletree ring to the connector member to permit only rotary motion therebetween.

Still further, it will be appreciated that the intermediate member can be connected directly to the carriage without the need for a connector member so long as the form of the connection between the intermediate member and the carriage is the same as that described for the connection between the intermediate member and the connector member, i.e. so long as the connection provides the same freedom of movement between the two members as well as the same constraints.

It will thus be seen that the present invention provides a simple, inexpensive correction for lead screw drunkenness without the need to specify extremely accurately manufactured, and thus very expensive, lead screws for use in systems sensitive to such errors, such as scan printing apparatus. By compensating for once per revolution lead screw errors, the present invention permits the use of much less expensive lead screws.

The invention has been described with reference to specific preferred embodiments and variations thereof, but it will be understood that other variations and modifications can be effected within the spirit and scope of the invention, which is defined by the following claims.

I claim:

1. A drive nut for transferring motion from a lead screw to a connector member comprising a pair of half-nuts arranged to engage the thread of said lead screw,
    an intermediate member connected to said half-nuts,
    a connector member,
    said intermediate member being connected to said connector member to permit movement of said intermediate member relative to said connector member by rotation about a pivot axis perpendicular to said lead screw and lying in a plane which extends between said half-nuts, and
    means for connecting each of said half-nuts to said intermediate member to locate said intermediate member with respect to said half-nuts along said lead screw and to prevent rotation of said half-nuts about the lead screw axis,
    whereby uneven advance of the two half-nuts along said lead screw causes the intermediate member to rotate about said pivot axis to provide uniform motion along said lead screw axis to said connector member.

2. A drive nut according to claim 1 including a pair of garter springs embracing the ends of said half-nuts to hold them in engagement with said lead screw while permitting relative motion between said half-nuts.

3. A drive nut according to claim 1 including a garter spring embracing said half-nuts to hold them in engagement with said lead screw while permitting relative motion between said half-nuts.

4. A drive nut for transferring motion from a lead screw to a connector member;
    said nut comprising a pair of half-nuts having an internal thread matching the thread of said lead screw, means for applying a force to hold said half-nuts in opposed engagement with said lead screw, an intermediate member connected to said half-nuts, a connector member, means for connecting said intermediate member to said connector member which permits movement of said intermediate member relative to said connector member only by rotation about a pivot axis perpendicular to said lead screw and lying in a plane which extends between said half-nuts, means for connecting one of said half-nuts to said intermediate member to positively locate said intermediate member with respect to said one half-nut along said lead screw and to prevent rotation of said half-nut about said lead screw, and means for connecting the other of said half-nuts to said intermediate member to positively locate said intermediate member with respect to said other half-nut along the direction of said lead screw and to prevent rotation of said half-nut about said lead screw, whereby uneven advance of the two half-nuts along the axis of said lead screw causes the intermediate member to rotate about said axis to compensate for said uneven advance thereby providing the connector member with uniform motion along the axis of said lead screw.

5. A drive nut according to claim 4 wherein said means for applying a force to hold said half-nuts in engagement with said lead screw includes a garter spring embracing said half-nuts which permits relative motion between said half-nuts.

6. A drive nut according to claim 4 wherein said means for applying a force to hold said half-nuts in engagement with said lead screw includes a pair of garter springs embracing the ends of said half-nuts which holds them in engagement with said lead screw while permitting relative motion between said half-nuts.

7. A drive nut for transferring motion from a lead screw to a connector member;

said nut comprising a pair of diametrically spaced half-nuts having an internal thread matching the thread of said lead screw, garter spring means embracing the ends of said half-nuts and adapted to hold said half-nuts in opposed engagement with said lead screw without applying constraint to the axial position of said half-nuts along said lead screw, said half-nuts adapted to engage diametrically opposite sides of said lead screw with a diametrically opposed gap between the two half-nuts, an intermediate member connected to said half-nuts, a connector member, pivot means for connecting said intermediate member to said connector member which permits only rotation of said intermediate member relative to said connector member about an axis perpendicular to said lead screw and lying in a plane which intersects the gap between said half-nuts, means for connecting one of said half-nuts to said intermediate member at a location remote from said pivot means and remote from said lead screw to positively locate said intermediate member with respect to said one half-nut along the direction of said lead screw and to prevent rotation of said half-nut about said lead screw, and means for connecting the other of said half-nuts to said intermediate member at a location remote from said pivot means and diametrically opposite from said connection to said one of said half-nuts and equispaced from said lead screw to positively locate said intermediate member with respect to said other half-nut along the direction of said lead screw and to prevent rotation of said other half-nut about said lead screw, said means for connecting said intermediate member to each of said half-nuts being disposed on opposite sides of the axis of rotation of said intermediate member whereby uneven advance of the two half-nuts along said lead screw caused by a once-per-revolution cyclical error in the lead screw causes the intermediate member to rotate about its pivot means to compensate for said uneven advance thereby providing the connector member with uniform motion along said lead screw.

* * * * *